(12) United States Patent
Jauregui (10) Patent No.: US 6,905,751 B2
(45) Date of Patent: *Jun. 14, 2005

(54) TILE COVERINGS WITH BORDERS AND INSERTS AND METHODS OF INSTALLATION

(75) Inventor: Alejandro Jauregui, Summerfield, NC (US)

(73) Assignee: Mohawk Brands Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/348,347

(22) Filed: Jan. 22, 2003

(65) Prior Publication Data

US 2004/0142141 A1 Jul. 22, 2004

(51) Int. Cl.$^7$ .......................... B32B 33/00; B32B 3/14; E04F 15/00
(52) U.S. Cl. ............................ 428/89; 428/88; 428/92; 428/48; 428/67
(58) Field of Search .................. 428/88, 89, 92, 428/45, 47, 48, 51, 67; 52/390

(56) References Cited

U.S. PATENT DOCUMENTS

| | | |
|---|---|---|
| 3,884,743 A | 5/1975 | Kunak et al. |
| 3,895,149 A | 7/1975 | Sheffler et al. |
| 4,010,302 A | 3/1977 | Anderson et al. |
| 4,064,816 A | 12/1977 | Spanel et al. |
| 4,411,666 A | 10/1983 | Hashizume et al. |
| 4,563,378 A | 1/1986 | Roth |
| 4,608,289 A | 8/1986 | McIntosh |
| 4,835,030 A | 5/1989 | Squier et al. |
| 4,851,061 A | 7/1989 | Sorkoram |
| 4,877,669 A | 10/1989 | Endrenyi, Jr. et al. |
| 4,988,551 A | 1/1991 | Zegler |
| 5,024,840 A | 6/1991 | Blakely et al. |
| 5,096,764 A | 3/1992 | Terry et al. |
| 5,198,277 A | 3/1993 | Hamilton et al. |
| 5,217,783 A | 6/1993 | Roth |
| 5,324,562 A | 6/1994 | Mullinax et al. |
| 5,383,415 A | 1/1995 | Padgett, III |
| 5,549,064 A | 8/1996 | Padgett, III |
| 5,560,307 A | 10/1996 | Padgett, III et al. |
| 5,560,972 A | 10/1996 | Blakely et al. |
| 5,605,107 A | 2/1997 | Padgett, III et al. |
| 5,612,113 A | 3/1997 | Irwin |
| 5,656,109 A | 8/1997 | Schilling et al. |
| 6,162,748 A | 12/2000 | Schilling et al. |
| 6,203,879 B1 | 3/2001 | Desai |
| 6,740,386 B2 * | 5/2004 | Hutchison .................... 428/88 |

FOREIGN PATENT DOCUMENTS

| | | | |
|---|---|---|---|
| GB | 2 310 158 | 8/1997 | |
| JP | 1-227715 | 3/1988 | |
| WO | WO 90/00967 | 2/1990 | |
| WO | WO 94/28225 | 12/1994 | |
| WO | WO 98/38374 | 9/1998 | |
| WO | WO 99/19557 | 4/1999 | |
| WO | WO 99/55954 | 11/1999 | |
| WO | WO 00/06853 | 2/2000 | |
| WO | WO 00/53865 | 9/2000 | |
| WO | WO 01/43925 | 6/2001 | |
| WO | WO 200143925 A1 * | 6/2001 | ........... B26D/00/00 |

* cited by examiner

Primary Examiner—Cheryl A. Juska
(74) Attorney, Agent, or Firm—Nixon & Vanderhye (57) ABSTRACT

A covering for a floor, wall or ceiling surface includes tiles each having first and second discrete tile sections. The first section includes a primary backing exposed on one side of the tile forming a first discrete exposed surface portion and a plurality of yarns tufted into the primary backing with cut or loop yarns on the back side of the primary backing leaving backstitches forming a second discrete exposed surface portion of the first section. The primary backing and backstitches form the first and second surface portions, respectively, of the first section with aesthetic characteristics different from one another. The second section of the tile is formed of one of a woven fabric, a non-woven fabric and a tufted pile and which second section forms the remaining portion of the exposed surface of the tile.

9 Claims, 10 Drawing Sheets

TILE COVERINGS WITH BORDERS AND INSERTS AND METHODS OF INSTALLATION

BACKGROUND OF THE INVENTION

The present invention relates to coverings, for example, for floors, walls or ceilings, and particularly to tiles of sectional construction whereby the tiles may have different aesthetic features.

Tiles, particularly tiles formed of textile materials, are well known for use as coverings for floors, walls or ceilings. For example, carpet tiles are oftentimes the choice for carpeting because of their ease of installation and oftentimes ease of replacement. Tiles are conventionally formed from a continuous web which is cut to form the discrete tiles. While tiles formed in this manner have proven eminently satisfactory, the tiles typically are not capable of being formed or provided in a manner affording widely variable aesthetic features such as color, texture or patterns. Where tiles are desirous having different aesthetic features, tiles from two different lines or webs are often intermixed to form, for example, checkerboard patterns of different colors or textures. Carpet tiles formed of a plurality of segments laser-cut from different webs of tile material and adhesively secured to a backing to form discrete tiles are also well known, for example, see U.S. Pat. No. 5,324,562. Plural tiles formed of high or low pile heights and of different colors, pile heights, naps or the like with cutouts and border sections are also known. For example, see PCT Publication No. WO 01/43925, wherein the cutouts remain attached to borders by bridging portions which are cut through upon installation so that the cutouts may be removed and swapped into other borders to form a pattern having different aesthetic features.

BRIEF DESCRIPTION OF THE INVENTION

In accordance with a preferred embodiment of the present invention, there is provided a covering formed of a plurality of tiles having sections interchangeable with one another to form a covering having different aesthetic characteristics such as colors, patterns, nap and/or pile heights. The tiles are installed using prefabricated tile sections wherein sections from one set of tiles formed of textile materials having certain structural and/or aesthetic characteristics are interchanged with sections of other tiles formed of different textile materials having different structural and/or aesthetic characteristics. Particularly, each set of prefabricated tiles are provided in sections, preferably constituting borders or frames and inserts removable from the borders. By producing tiles having separable sections, i.e., borders and inserts, the borders and inserts of different tiles having different characteristics can be combined to form tiles having unique aesthetics, e.g., different patterns, colors and/or textures, than would otherwise be possible with tiles formed from integrated webs having unitary aesthetic characteristics.

In a preferred embodiment of the present invention, one of the sets of tiles is formed from a first web of a uniquely fabricated textile material. For example, the web has a primary backing in part exposed on one side of the web for forming a discrete wear surface portion of the wear surface of the tiles to be cut from the web. A plurality of yarns are tufted into the primary backing along the remaining part of the first web forming cut or loop yarns on a back side of the primary backing remote from the wear surface. This leaves a plurality of backstitches of the tufted yarns along and forming remaining portions of the wear surface of the first web. A resin fixes the cut or loop pile tufted yarns along the back side of the primary backing. Thus, the first web, and each tile cut from the first web, has discrete wear surfaces comprised of backstitches and primary backing portions discretely exposed therealong and which surfaces have different structural and aesthetic characteristics distinguished from one another. Another set of tiles is formed from a second web formed of a textile material comprised of one of a tufted pile, a woven fabric and a non-woven fabric. It will also be appreciated that one or more additional sets of tiles may be formed from further webs having different structural and/or aesthetic characteristics.

It will therefore be appreciated that webs formed of at least two different textile materials are cut to form the tiles. The tiles are also cut to form tile sections, preferably borders, i.e., frames and inserts. When formed into tiles, the inserts are severed, partially or wholly, from the borders and may either remain with the tiles for delivery to an installation site or be packaged separately for delivery to the installation site. At the installation site, the sections of the tiles formed of the same textile material from the one web are interchanged with sections of the tiles formed of different textile materials from the second or another web, and laid, e.g., in a checkerboard pattern on a floor, wall or ceiling surface. In a specific preferred example, a first section formed from the first web and having the exposed primary backing and exposed backstitch portions forming discrete exposed aesthetic wear surfaces is provided as part of an insert for a tile. The border or frame of the tile is provided by a second section formed from the second web and comprises, for example, a tufted pile. Thus, the insert of the first section is received in the opening of the border or frame of the second section. A second tile may be formed of the reverse configuration, i.e., with textile material of the first web forming the frame or border of a first section about the textile material of the second web forming the insert of the second section, i.e., the tufted material. It will be appreciated that there is no wastage involved in producing tiles of this type because each of the borders and inserts of each tile formed of the different textile materials is utilized in the final installation.

It will also be appreciated that the provision of tiles of this type enables the creation of unique aesthetics. Further, alternating frames and inserts of different textured products may have slightly different heights, forming an aesthetically pleasing appearance. Any such height differential, however, is sufficiently small as to not afford a trip hazard where the covering is employed as a floor carpet. Also, the pile from one of the border or inserts will tend to overlie the lower top surface of the other border or insert to further minimize any such potential hazards. Thus, the different heights of the sections afford an additional aesthetic characteristic.

In a preferred embodiment according to the present invention, there is provided a covering for a floor, wall or ceiling surface, comprising a tile having first and second discrete tile sections and having an exposed surface, the first section having a primary backing in part exposed on one side of the tile for forming a first discrete exposed surface portion of the first section, a plurality of yarns tufted into the primary backing along a remaining part of the first section forming cut or loop yarns on a back side of the primary backing leaving a plurality of backstitches of the tufted yarns along and forming a second discrete exposed surface portion of the first section, a resin fixing the cut or loop pile tufted yarns along the back side of the primary backing, the primary backing and the backstitches exposed along the first and second surface portions, respectively, of the first section having aesthetic characteristics distinguished from one another and the second section of the tile being formed of one of a woven fabric, a non-woven fabric and a tufted pile, having loops or cut loops, and forming a remaining portion of the exposed surface of the tile.

In a further preferred embodiment according to the present invention, there is provided a covering for covering a floor, wall or ceiling surface, comprising a plurality of tiles each having first and second discrete tile sections forming an exposed surface, each first section having a primary backing in part exposed on one side of the tile for forming a first discrete exposed surface portion of the first section, the first section of each tile including a plurality of yarns tufted into the primary backing along a remaining part thereof forming cut or loop yarns on a back side of the primary backing, leaving a plurality of backstitches of the tufted yarns along and forming a second discrete exposed surface portion of the first section, the first section of each tile including a resin fixing the cut or loop pile tufted yarn along the back side of the primary backing, the primary backing and the backstitching exposed along the first and second surface portions, respectively, of the first section of each tile having aesthetic characteristics distinguished from one another and the second section of each tile being formed of one of a woven fabric, a non-woven fabric and a tufted pile, having loops or cut loops, and forming a remaining portion of the exposed surface of the tile, the tiles being arranged in an array thereof with margins of each tile abutting one another to form the covering.

In a further preferred embodiment according to the present invention, there is provided a method of forming a covering for a floor, wall or ceiling surface, comprising the steps of (a) providing a plurality of tiles each having first and second sections and having exposed surfaces, (b) providing the first section of each tile with a primary backing in part exposed on one side of the tile for forming a first discrete exposed surface portion of the first section, (c) providing the second section of each tile with one of a tufted pile, a woven fabric and a non-woven fabric forming another discrete exposed surface portion of the first section and (d) arranging the tiles on the surface with border portions of each tile constituted by one of the first and second sections and interior portions of each tile constituted by another of the first and second sections.

DETAILED DESCRIPTION OF THE INVENTION

Figure 1A:
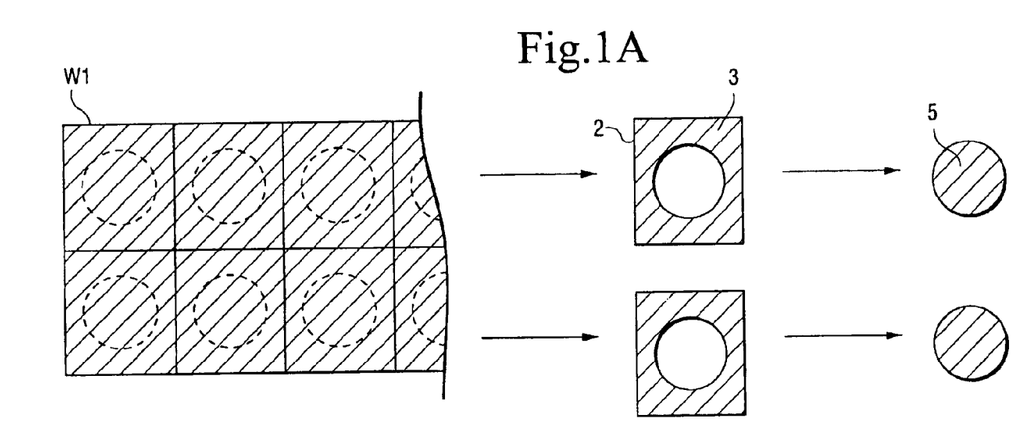
FIGS. 1A and 1B illustrate the formation of discrete tiles from respective webs of different textile materials with each tile from each web being formed into separable tile sections.
Figure 1B:
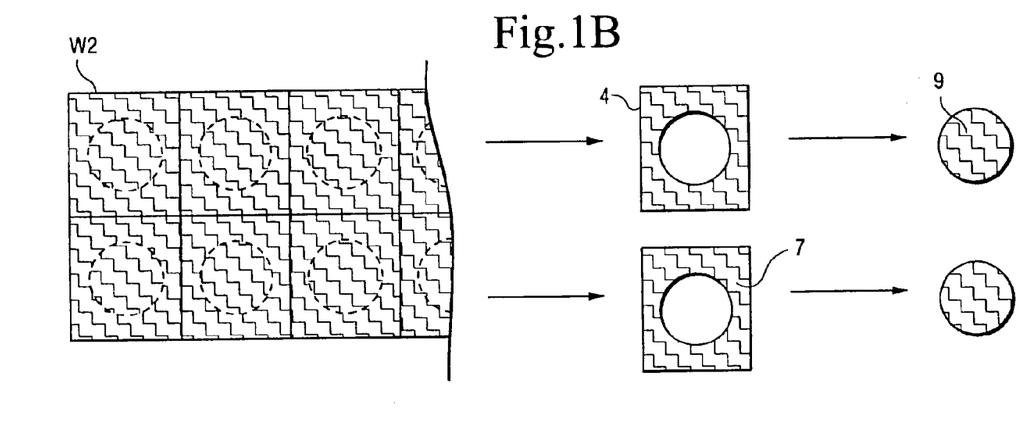

Referring now to the drawings, particularly to FIGS. 1A and 1B, there is illustrated at least a pair of webs W1 and W2 formed of respective different textile materials. Tiles are formed from webs W1 and W2, for example, by cutting the webs, at the factory, into intermediate tiles 2 and 4, respectively. Intermediate tile 2 is preferably formed into respective tile sections 3 and 5. Intermediate tile 4 is also formed into respective tile sections 7 and 9. The intermediate tile sections 3, 7 and 5, 9 are illustrated in the form of borders or frames and inserts, respectively, although it will be appreciated that the tile sections may comprise other configurations, e.g., triangle, square, or rectilinear-shaped inserts with correspondingly shaped borders. Also, the tiles need not wholly enclose the inserts but may be formed otherwise, e.g., in strips. The intermediate tiles 2 and 4 may thus be formed at a factory and packaged, either with the central inserts 5 and 9 within the borders or frames 3 and 7, respectively, or with the various borders and inserts in separate packages.

Figure 2:
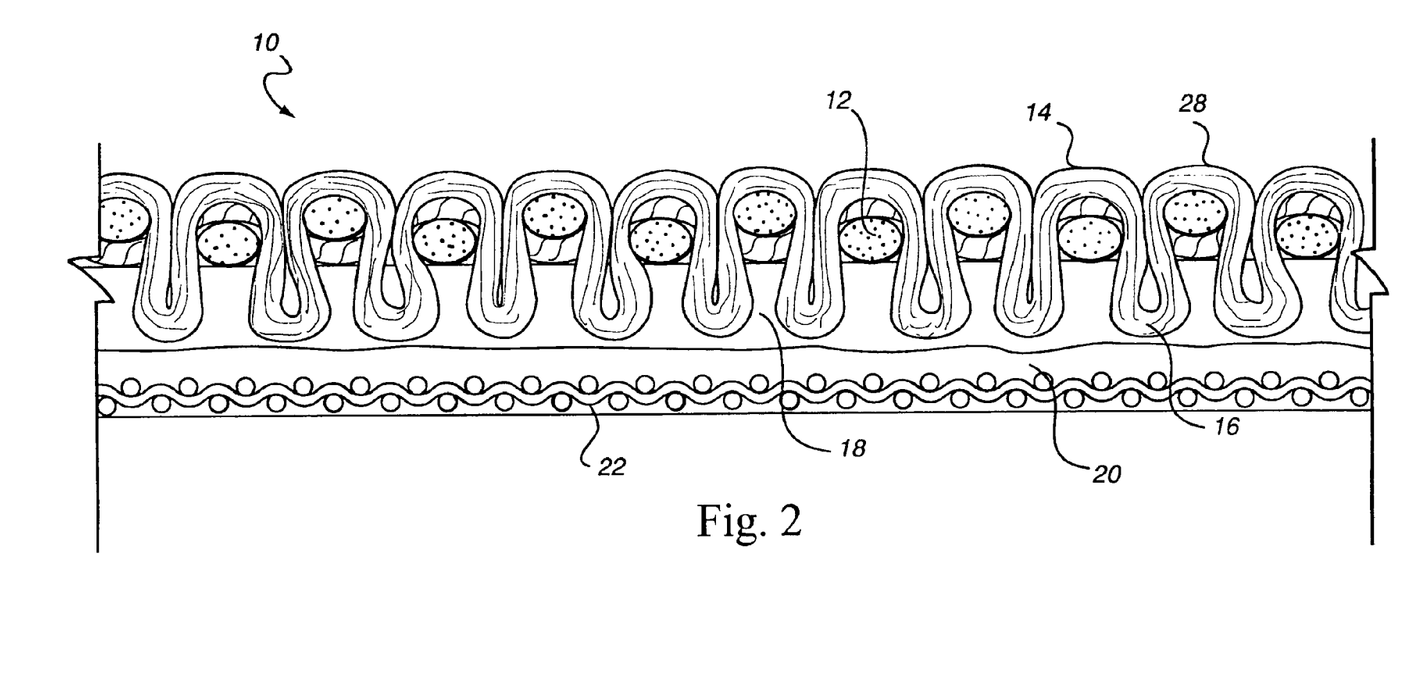
FIG. 2 is a schematic cross-sectional view of a portion of a covering formed from one of the webs of textile materials.

In a preferred embodiment of the present invention and referring to FIG. 2, the textile material of web W1 may comprise a woven polypropylene primary backing 12 which is tufted in a conventional manner by passing textured or untextured continuous filament or spun yarns 14 through the woven backing, forming looped yarns 16 along the underside of the primary backing 12. The tufting process is conventional and any type of fiber may be utilized for the yarn being tufted, for example, a polyester, polyolefin, polylactic acid or nylon, as desired. Moreover, while tufted continuous loop yarns 16 are illustrated on the back side of the primary backing 12, it will be appreciated that the loops or loop yarns 16 may comprise cut pile yarns along the back side of the primary backing 12. The woven primary backing may also have an ultraviolet (UV) stabilizer to protect against the degrading effect of ultraviolet rays. That is, the primary backing is formed preferably of a woven polypropylene with a UV stabilizer added during extrusion of the polypropylene yarn forming the primary backing.

A resin 18 is applied along the back side of the primary backing and coats, encapsulates and saturates the loops 16 to lock the loop yarns in place. A Unibond® backing or coating is then applied over the resin-coated, continuous loop yarns 16. The Unibond® coating 20 comprises a mixture of ethylvinyl acetate (EVA), calcium carbonate and a resin. The Unibond® coating is applied as a hot melt composition over the resin 18. While the hot melt is still in a liquid or plastic condition, a secondary backing, preferably a woven polypropylene scrim 22, is applied to the Unibond® coating 20. The covering is then passed over a chill table to set and solidify the Unibond® coating and secure the secondary backing 22 in the covering construction. The secondary backing 22 provides integrity and dimensional stability to the covering.

From a review of FIG. 2, it will be appreciated that the backstitches 28 of the tufted yarns 14 are exposed through the primary backing 12 and form part of an exposed or wear surface. Moreover, each backstitch 28 is tufted tightly such that it is in substantial continuous contact with the woven polypropylene primary backing 12 for the entirety of its length exposed through the primary backing 12 on the wear surface.

Figure 3:
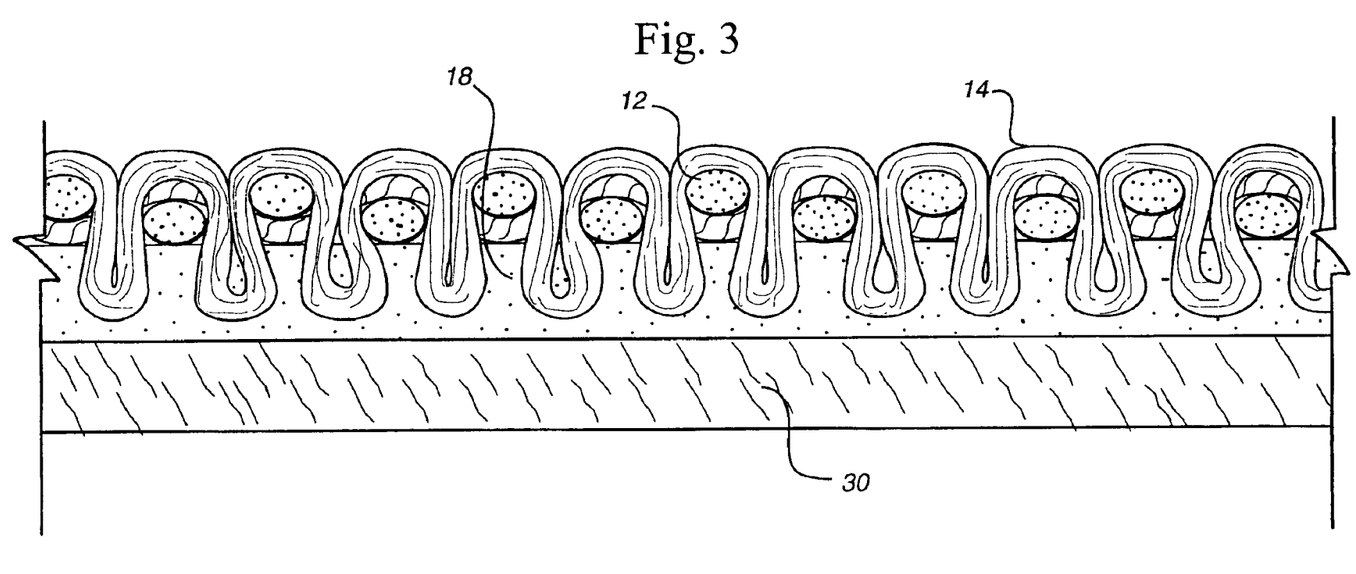
FIGS. 3 and 4 are views similar to FIG. 2 illustrating further embodiments of the covering formed from the one web for use in the present invention.

To provide an enhanced cushioning effect, e.g., for carpeting, and referring to FIG. 3, there is illustrated a woven primary backing 12 tufted with continuous loop yarns 14, which are coated on the underside by a resin 18, similarly as in FIG. 2. In this form, however, a needle-bonded synthetic fibrous and maincoat mat 30 underlies the resin coating 18. The needle-bonded synthetic fibers forming mat 30 may comprise nylon and polypropylene in a cut mixture thereof and mixed with a resin. Preferably, all, none or a proportion of the cut fibers may be formed from waste material from other textile manufacturing streams.

Figure 4:
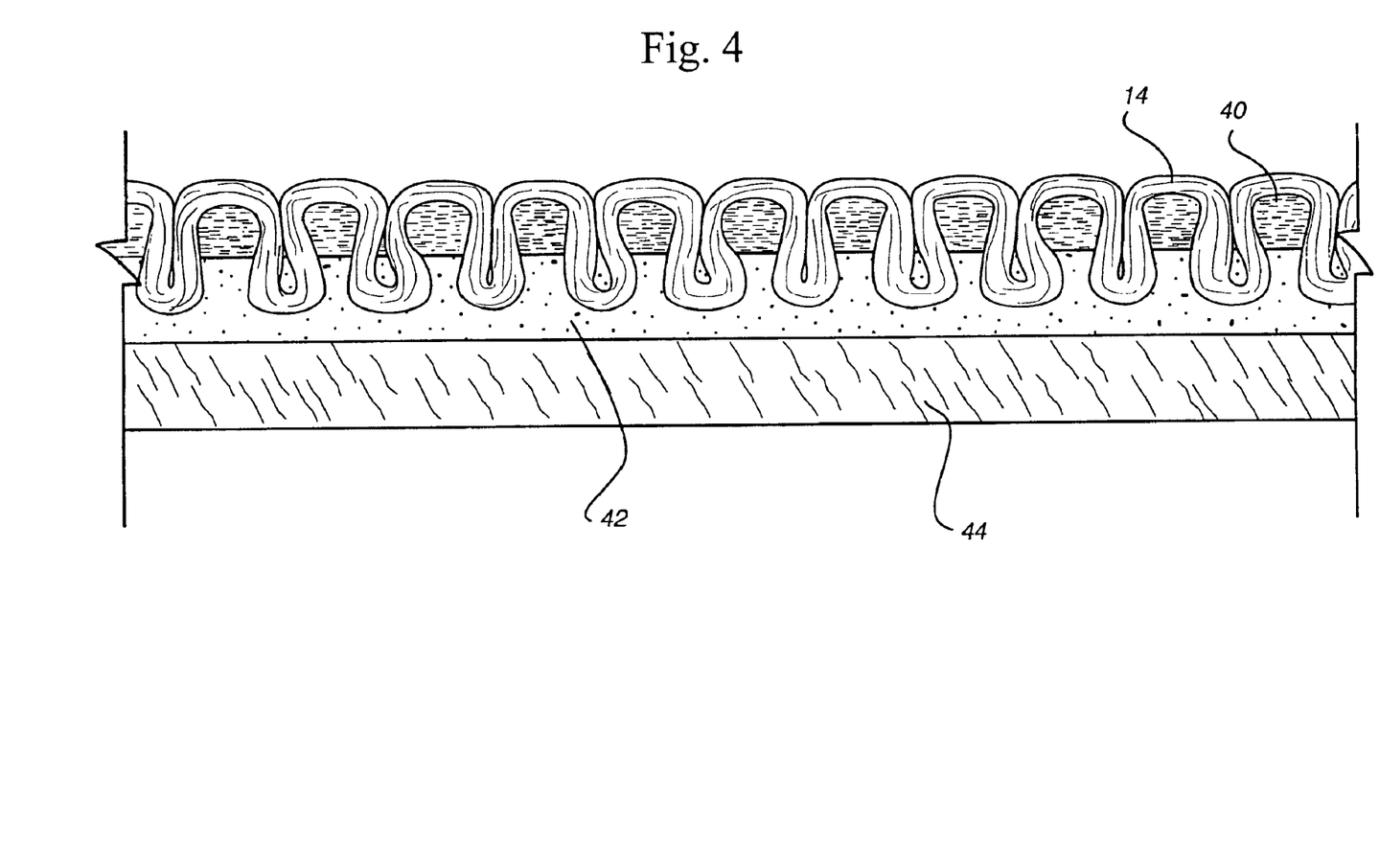

Referring now to FIG. 4, and in lieu of a woven polypropylene primary backing 12, there is provided a non-woven primary backing 40, particularly useful for modular carpeting, i.e., carpet tiles. The non-woven primary backing is preferably formed of a mixture of nylon and polyester fibers. Those fibers are reduced and mixed together and passed between heated rolls to flatten the fibers and form a composite flat sheet structure. The polyester fibers essentially bond the nylon fibers to one another. This sheet may then be tufted, with either the cut or continuous loop yarns 14, to form a highly dimensionally stable primary backing.

While it is possible to provide the non-woven primary backing with either the Unibond® material and the woven scrim as a secondary backing or the needle-bonded synthetic fiber backing, the non-woven backing is not necessary, for example, for broadloom carpeting. Preferably, and for use in forming tiles, a PVC backing is provided to the non-woven primary backing. Particularly, a PVC precoat 42 is applied to the tufted yarn loops 14 to trap and lock the loops in place along the underside of the non-woven primary backing 40. A main coat 44 of heavier PVC is then applied, together with a fiberglass stabilizer layer for additional stability.

Figure 5:
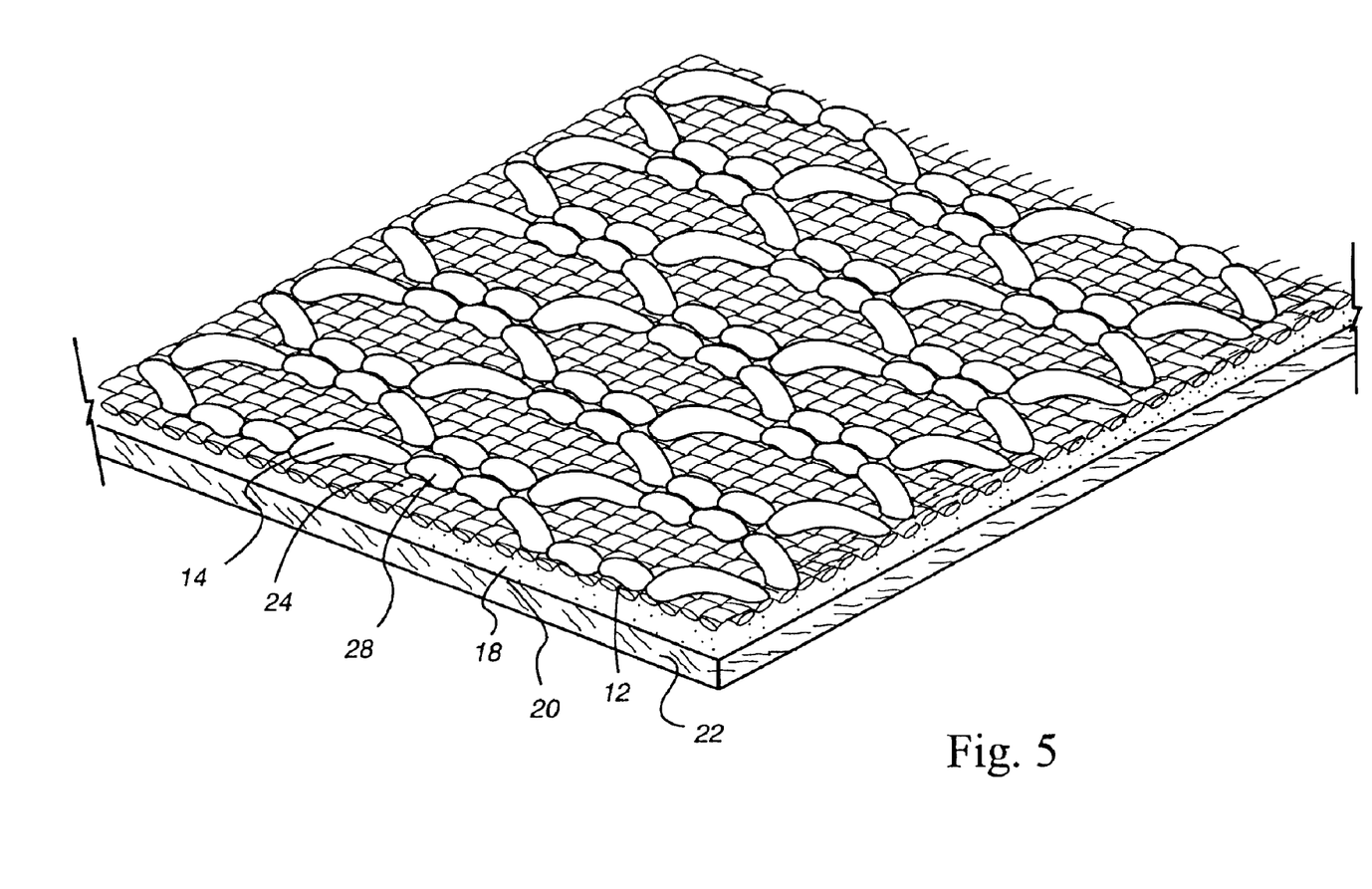
FIG. 5 is a perspective view illustrating the wear surfaces of the one textile web forming portions of tiles hereof.

It will be appreciated that in all of the foregoing constructions of web W1, the exposed or wear surface of the covering comprises, e.g., as illustrated in FIG. 5, non-tufted exposed primary backing portions 24 and exposed backstitches 28 of tufted yarns formed in an aesthetically pleasing pattern of low, dense fibers where the exposed, non-tufted primary backing portion 24 forms part of the aesthetic design element for the exposed surface. Other configurations of the unique covering described above for forming web W1 may be provided with different relative arrangements of the exposed primary backing portions 24 and the exposed backstitches 28.

The foregoing construction of FIGS. 2–4 hereof is described and illustrated in U.S. patent application Ser. No. 09/846,782 filed May 2, 2001, of common assignee herewith, the disclosure of which is incorporated herein by reference.

The web W2 may be formed of a different color, texture or pattern of the same or similar textile materials as the web W1. Alternatively, the web W2 may be formed of any one of a woven fabric, a non-woven fabric and a tufted web having loops or cut loops forming an exposed wear surface for the remaining portion of the web. It will be appreciated from the foregoing that the installer of the covering is provided with two or more sets of intermediate tiles, each set being comprised of sections formed of identical material which can be interchanged with one another to form final installed tile coverings. As illustrative, each tile segment is in the form of a border or frame and a central circular insert, although other configurations may be provided, as noted previously.

Figure 6A:
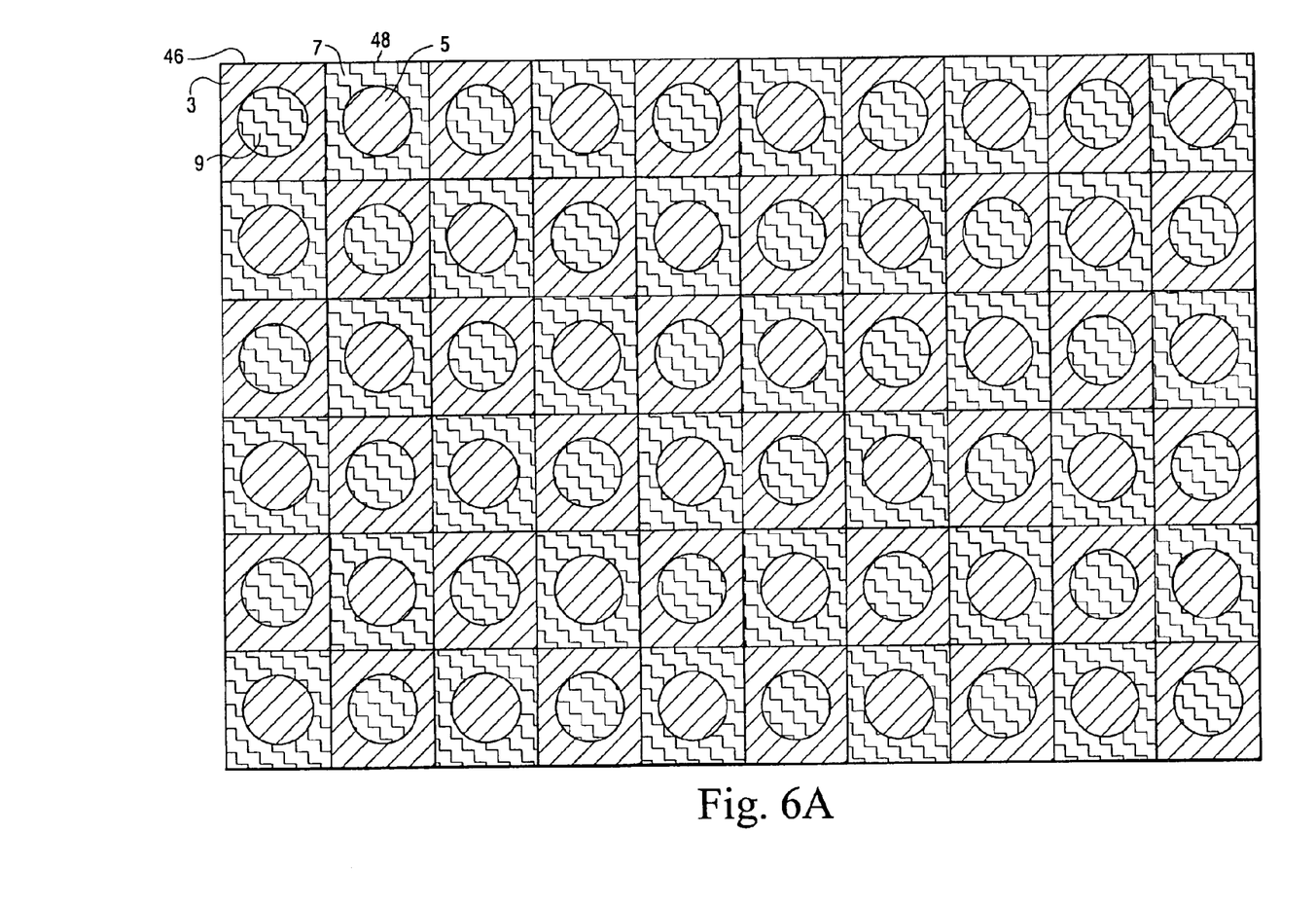
FIGS. 6A and 6B are illustrative of tile layouts in accordance with the present invention.

In accordance with the present invention and referring to FIG. 6A, the intermediate tiles 2 and 4 may have their sections interchanged with one another to form final tiles for final installation with sections of different structural and aesthetic characteristics. The final tiles, e.g., can be laid in a checkerboard pattern as illustrated in FIG. 6A. Thus, in FIG. 6A, the first section of a final rectilinear tile 46 may comprise a border 3 of an intermediate tile 2 formed from web W1. A second section of tile 46 may comprise an insert 9 of intermediate tile 4 formed from web W2. The next final tile 48 in a longitudinal direction may have a border 7 of intermediate tile 4 formed from web W2 and an insert 5 of intermediate tile 2 formed from web W1. The final tiles 46 and 48 alternate in a longitudinal direction. Also, the final tiles may alternate in a transverse direction as illustrated in FIG. 6A to provide the checkerboard pattern.

Figure 6B:
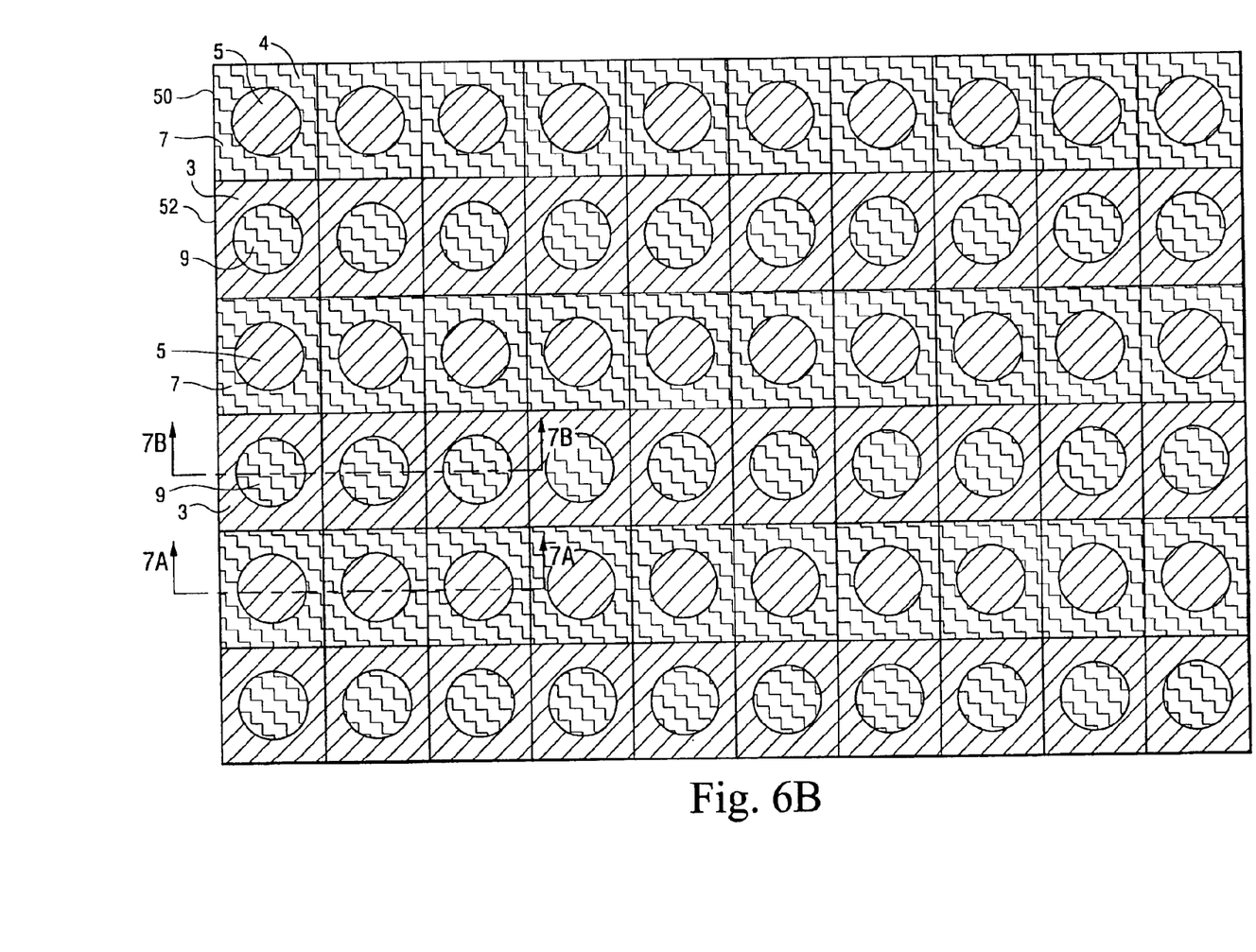

In FIG. 6B, a different pattern is formed by aligning like final tiles in longitudinal rows thereof with each final tile in each row being formed of a border and insert of different materials. For example, the first row 50 of final tiles may have a border 4 formed of material from web W2 and a central insert 5 formed of the material from web W1, each tile of the first row 50 thus corresponding to tile 48 illustrated in FIG. 6A. The laterally transverse row 52 may be formed in a reverse configuration. For example, the next lateral row 52 may have a border 3 formed from the material of web W1 and an insert 9 formed from the material of web W2. FIGS. 6A and 6B are considered representative examples of two of various patterns that can be accomplished according to the present invention.

Figure 7A:
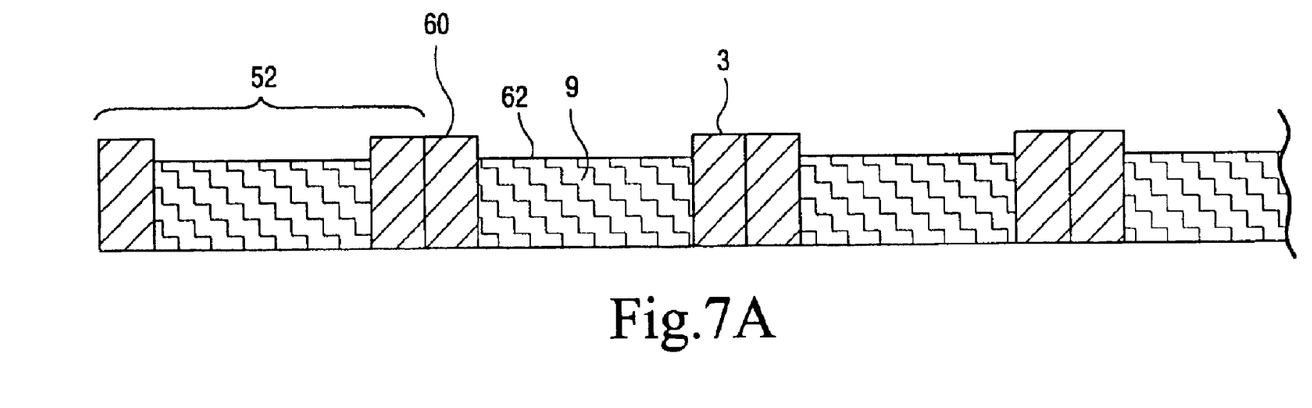
FIGS. 7A and 7B are enlarged cross-sectional views of the tiles schematically illustrating differences in heights of various portions of each tile.
Figure 7B:
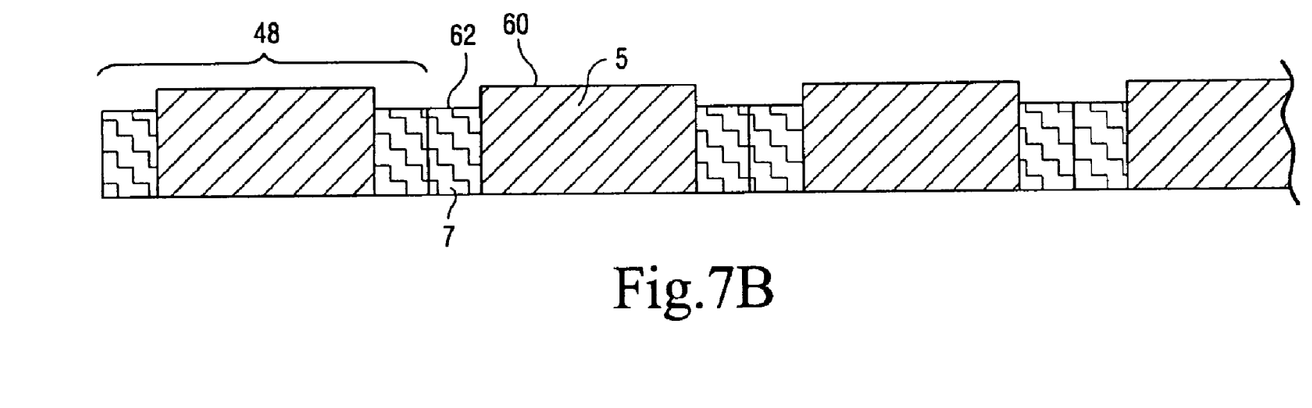

Referring to FIGS. 7A and 7B, border and insert areas formed of the materials of webs W1 and W2, respectively, are illustrated. In FIG. 7A, the borders 3 formed of material from web W1 have an exposed wear surface 60 above the exposed wear surface 62 of the inserts 9 formed of the material of web W2. Alternatively, the borders 3 may have an exposed wear surface 60 below the exposed wear surface 62 of insert 9. Alternatively, the borders 3 may have an exposed wear surface 60 below the exposed wear surface 62 of insert 9. Conversely, the inserts 5 formed of the material of web W1 may have an exposed wear surface 60 above the exposed wear surface 62 of the frame or border 7 formed of the material of web W2 as illustrated in FIG. 7B. Alternatively, the borders 7 may have an exposed wear surface 62 above the exposed wear surface 60 of insert 5.

Figure 8A:
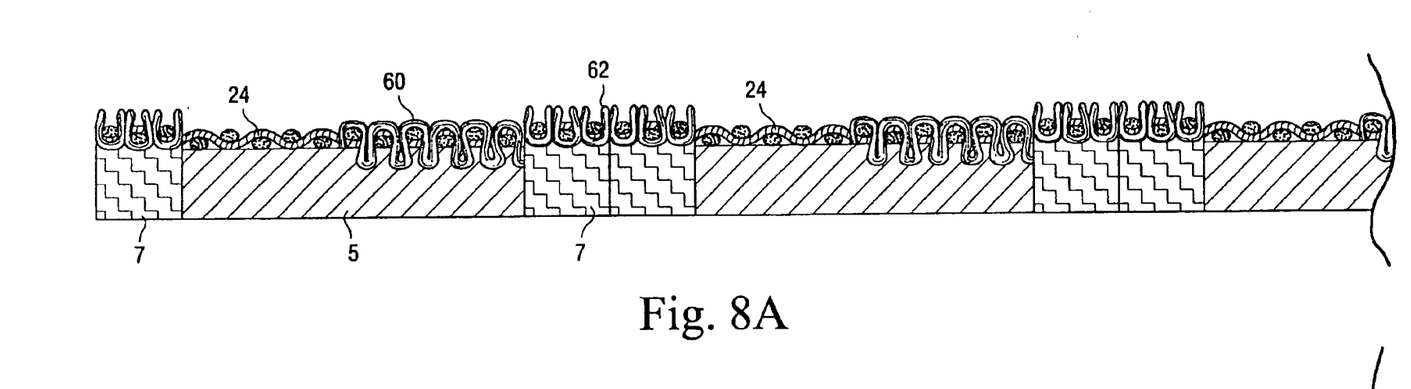
FIGS. 8A and 8B are cross-sectional views illustrating the interchangeability of the materials of the webs for forming tiles having inserts and frames of different textile materials.
Figure 8B:
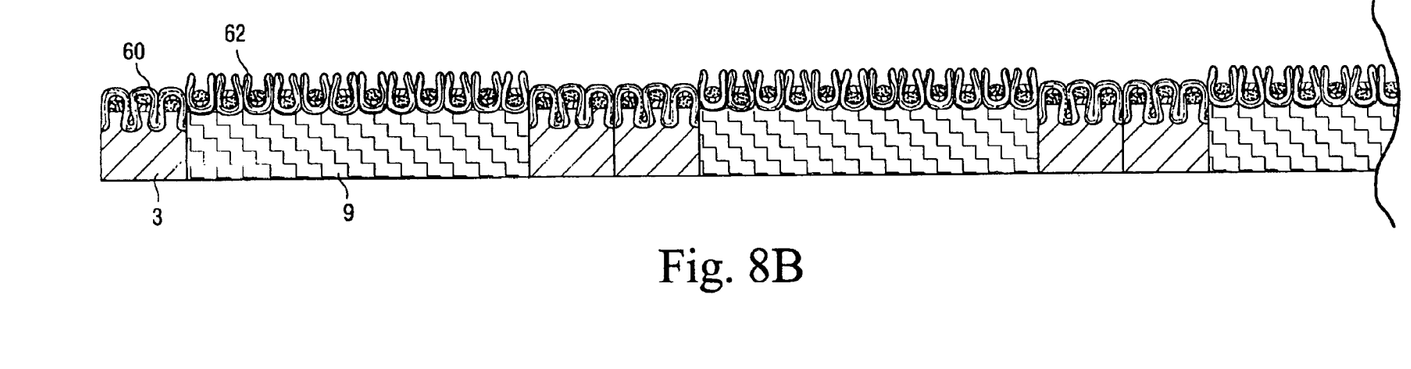

FIGS. 8A and 8B illustrate a covering formed of a tufted fabric from web W2 and employed as a border 7 for the final tile and an insert 5 formed of textile material from web W1. The border 7 is illustrated as having an exposed wear surface 62 higher than the wear surface 60 of the insert 5. FIG. 8B illustrates the converse. Thus, the insert 9 is formed of a tufted material from web W2, while the border 3 is formed of a material from the web W1. The inserts 9 are illustrated as having exposed wear surfaces 62 higher than the exposed wear surfaces 60 of the borders 3, the latter having exposed wear surfaces including a combination of primary backing and backstitches.

Figure 9:
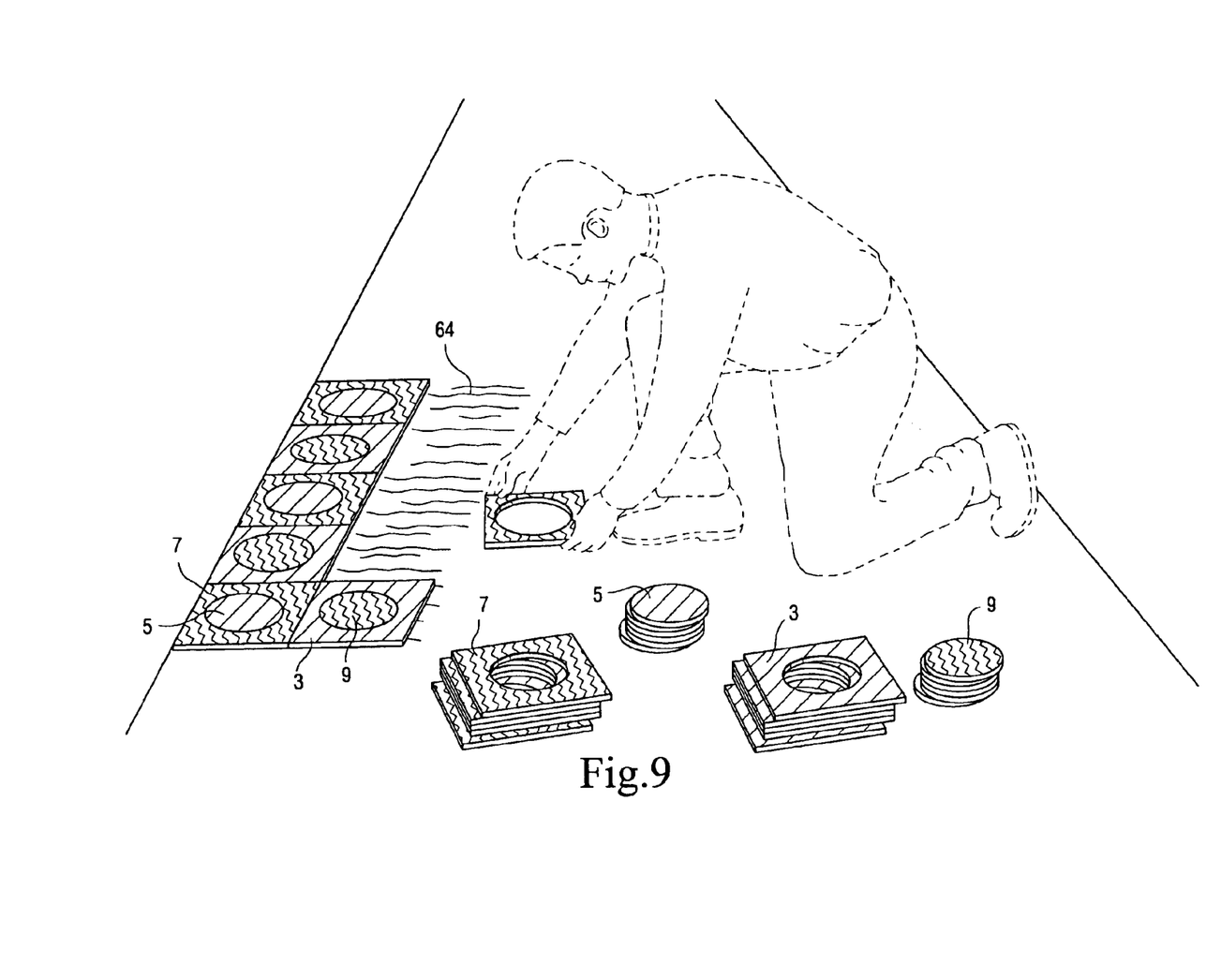
FIG. 9 is a schematic illustration of the installation of tiles according to the present invention.

With reference to FIG. 9, the installation process may proceed similarly as with conventional tiles, except that the borders and inserts are interchanged with one another as between materials formed from the different webs W1 and W2. For example, the checkerboard pattern of FIG. 6A is illustrated in FIG. 9 as being laid on a floor surface. The installer thus alternately places inserts of the different sections into frames or borders of the other sections and lays the final tiles, using an adhesive 64. It will be appreciated that by using inserts and borders, an endless edge between each insert and its border is provided, which also minimizes and inhibits any tendency of a gap or ridge to be formed between the adjoining edges of the insert and border.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A covering for a floor, wall or ceiling surface, comprising:
   a tile having first and second discrete tile sections and having an exposed surface;
   said first section having a primary backing in part exposed on one side of the tile for forming a first discrete exposed surface portion of the first section;
   a plurality of yarns tufted into said primary backing along a remaining part of said first section forming cut or loop yarns on a back side of said primary backing leaving a plurality of backstitches of the tufted yarns along and forming a second discrete exposed surface portion of said first section;
   a resin fixing said cut or loop pile tufted yarns along the back side of said primary backing;
   said primary backing and said backstitches exposed along said first and second surface portions, respectively, of said first section having aesthetic characteristics distinguished from one another; and
   said second section of said tile being formed of one of a woven fabric, a non-woven fabric and a tufted pile, having loops or cut loops, and forming a remaining portion of the exposed surface of said tile.

2. A covering according to claim 1 wherein said first and second tile sections have respective discrete edges abutting one another.

3. A covering according to claim 1 wherein said first and second tile sections each have endless edges in abutting relation to one another.

4. A covering according to claim 1 wherein the elevation of the first and second sections is different from one another.

5. A covering for covering a floor, wall or ceiling surface, comprising:
   a plurality of tiles each having first and second discrete tile sections forming an exposed surface;
   each said first section having a primary backing in part exposed on one side of the tile for forming a first discrete exposed surface portion of the first section;
   the first section of each said tile including a plurality of yarns tufted into said primary backing along a remaining part thereof forming cut or loop yarns on a back side of said primary backing, leaving a plurality of backstitches of the tufted yarns along and forming a second discrete exposed surface portion of the first section;
   said first section of each said tile including a resin fixing said cut or loop pile tufted yarn along the back side of said primary backing;
   said primary backing and said backstitching exposed along said first and second surface portions, respectively, of said first section of each tile having aesthetic characteristics distinguished from one another; and
   said second section of each said tile being formed of one of a woven fabric, a non-woven fabric and a tufted pile, having loops or cut loops, and forming a remaining portion of the exposed surface of said tile;
   said tiles being arranged in an array thereof with margins of each tile abutting one another to form the covering.

6. A covering according to claim 5 wherein said first and second tile sections each have endless edges in abutting relation to one another.

7. A covering according to claim 5 wherein the height of the first and second sections is different from one another.

8. A covering according to claim 5 wherein said first and second tile sections each have endless edges in abutting relation to one another, one of said tiles having a border constituted by said first section and surrounding an insert constituted by said second section.

9. A covering according to claim 5 wherein said first and second tile sections each have endless edges in abutting relation to one another, one of said tiles having a border constituted by said second section and surrounding an insert constituted in said first section.

* * * * *